(12) United States Patent
Zárate et al.

(10) Patent No.: US 9,048,615 B1
(45) Date of Patent: Jun. 2, 2015

(54) SLAB GAS LASER WITH PRE-IONIZING CELL

(71) Applicant: Epilog Corporation, Golden, CO (US)

(72) Inventors: Roberto Julio Ramírez Zárate, Arvada, CO (US); Jay Austin Moore, Broomfield, CO (US)

(73) Assignee: Epilog Corporation, Golden, CO (US)

( * ) Notice: Subject to any disclaimer, the term of this patent is extended or adjusted under 35 U.S.C. 154(b) by 0 days.

(21) Appl. No.: 14/094,227

(22) Filed: Dec. 2, 2013

(51) Int. Cl.
*H01S 3/038* (2006.01)
*H01S 3/0977* (2006.01)
*H01S 3/03* (2006.01)
*H01S 3/0971* (2006.01)

(52) U.S. Cl.
CPC ............ *H01S 3/0384* (2013.01); *H01S 3/0977* (2013.01); *H01S 3/0315* (2013.01); *H01S 3/09713* (2013.01); *H01S 3/0385* (2013.01)

(58) Field of Classification Search
CPC . H01S 3/0315; H01S 3/0385; H01S 3/09713; H01S 3/0384; H01S 3/0977
USPC .............................................. 372/64, 86, 87
See application file for complete search history.

(56) References Cited

U.S. PATENT DOCUMENTS

| | | | |
|---|---|---|---|
| 4,637,030 A * | 1/1987 | Midavaine et al. | 372/82 |
| 5,131,004 A | 7/1992 | Dallarosa | |
| 5,434,881 A * | 7/1995 | Welsch et al. | 372/87 |
| 6,456,643 B1 | 9/2002 | Osmanow | |
| 6,480,519 B2 | 11/2002 | Kakizaki | |
| 6,999,490 B2 | 2/2006 | Kennedy | |
| 7,545,842 B2 | 6/2009 | Shackleton | |

\* cited by examiner

*Primary Examiner* — Julio J Maldonado
*Assistant Examiner* — Michael Carter
(74) *Attorney, Agent, or Firm* — Swanson & Bratschun, L.L.C.

(57) ABSTRACT

A slab gas laser has a live slab electrode and a ground slab electrode with the live slab electrode and the ground slab electrode defining a primary gas discharge chamber therebetween. The live electrode is in electrical communication with a first AC power supply to provide a first excitation signal. A pre-ionizing cell comprises a live electrode and a ground electrode defining a pre-ionizing gas discharge chamber therebetween. The live electrode is in electrical communication with a second AC power supply distinct from the first AC power supply to provide a second excitation signal delivering a discharge of electrons from the pre-ionizing gas discharge chamber. The pre-ionizing and the primary gas discharge chambers are aligned such that the pre-ionizing cell is oriented with the edges of its live and ground electrodes adjacent and substantially parallel to edges of the ground slab and live slab electrodes, respectively.

11 Claims, 8 Drawing Sheets

SLAB GAS LASER WITH PRE-IONIZING CELL

TECHNICAL FIELD

Slab gas lasers, more particularly, a slab gas laser including a pre-ionizing cell.

BACKGROUND

Slab gas lasers, and in particular, slab $CO_2$ lasers are well known and are used in a wide variety of applications including laser based cutting and engraving machines. A typical slab gas laser includes a live slab electrode and a ground slab electrode which define a primary gas discharge chamber there between. The live electrode is in electrical communication with a power supply to provide an excitation signal. A known problem with gas slab lasers is that without enough free electrons at the time of applying the excitation signal, the laser may have a plasma breakdown delay or skip some of the first pulses of laser discharge, which is undesirable when used in applications such as engraving. In order to eliminate this problem, it is known to provide free electrons to the primary gas discharge chamber upon actuation of the excitation signal in a process known as pre-ionization.

Several methods of providing pre-ionization are known, and include the use of UV lamps, DC-corona plasma formation, spark arc ionization and application of a low intensity excitation signal into the laser amplifying medium, known as a "tickle signal". However, each of these methods of pre-ionization have recognized shortcomings, such as a limited lifespan of UV lamps, introduction of contaminant particles resulting from DC-corona plasma formation which will reduce the effective lifetime of the laser or unintended lasing action caused by application of a tickle signal.

One method to overcome these shortcomings is the use of a pre-ionization cell to provide free electrons to the gas discharge chamber. One such pre-ionization cell is shown Welsch, U.S. Pat. No. 5,434,881. Welsh teaches providing auxiliary electrodes adjacent to a primary gas discharge chamber defined between slab electrodes. Welsch teaches that providing the electrodes to form an auxiliary discharge path roughly parallel to the slab electrode surfaces can provide electrons into the region of the gas discharge path between the slab electrodes to provide improved ignitability of the discharge therein. Welsch teaches that a plurality of the auxiliary electrodes may be distributed along the electrode surfaces, that the auxiliary discharges therefrom can be pulsed and that the auxiliary discharges can be made continuously or ignited synchronously with the main discharge. However, the pre-ionization cell taught by Welsch is not without shortcomings of its own. In particular, Welsch teaches aligning the ground slab electrode with the ground electrode of the pre-ionization cell and the live slab electrode with the live electrode of the pre-ionization cell. This arrangement can lead to cross-talking between an amplifier driving the live slab electrode and the amplifier driving the live electrode of the pre-ionization cell, disrupting operation of the amplifiers. In addition, the pre-ionization cell of Welsch risks creation of an electromagnetic field in close proximity to the primary gas discharge chamber which can interfere with the operation of the slab gas laser. The slab gas laser with a pre-ionization cell disclosed herein is intended directed toward overcoming one or more of the problems discussed above.

SUMMARY OF THE EMBODIMENTS

A first aspect of the invention is a slab gas laser having a live slab electrode and a ground slab electrode with the live slab electrode and the ground slab electrode defining a primary gas discharge chamber therebetween. The live electrode is in electrical communication with a power supply, for example a first AC power supply to provide a first excitation signal. A pre-ionizing cell comprises a live electrode and a ground electrode defining a pre-ionizing gas discharge chamber therebetween. The live electrode is in electrical communication with a second power supply, for example a second AC power supply distinct from the first AC power supply to provide a second excitation signal delivering a discharge of electrons from the pre-ionizing gas discharge chamber. The pre-ionizing gas discharge chamber is operatively associated with the primary gas discharge chamber to provide electrons having enough energy to provide near instantaneous discharge ignition in the primary gas discharge chamber by the first excitation signal upon actuation of the first RF power supply at a power output capable of sustaining discharge in the primary gas discharge chamber but otherwise unable to provide near instantaneous discharge ignition in the primary gas discharge chamber. The operative association of the pre-ionizing and the primary gas discharge chambers comprises the pre-ionizing cell being oriented with the edges of its live and ground electrodes adjacent and substantially parallel to edges of the ground slab and live slab electrodes, respectively.

An embodiment may include the live electrode and the ground electrode of the pre-ionizing cell each have an inner surface defining the pre-ionizing gas discharge chamber therebetween and an outer surface. At least one of the life electrode and the ground electrode have an inclined surface extending between near its inner surface to the outer surface such that the gas discharge chamber extends beyond the outer surface toward the primary gas discharge chamber. The incline surface may be at, for example, 45 degrees from the outer surface.

Embodiments may include the second excitation signal being insufficient to cause gas discharge in the primary gas discharge chamber. In certain embodiments, the pre-ionizing cell delivers a substantially constant discharge of electrons. In certain embodiments the pre-ionizing cell delivers a pulsed discharge of electrons Certain embodiments may include the primary gas discharge chamber having an elongate length along an axis and a width transverse the axis with a pre-ionizing cell being located along the length of the primary discharge chamber. Certain embodiments may include a plurality of a pre-ionizing cells spaced along the length of the primary gas discharge chamber. Certain embodiments may have a pre-ionizing cell located along the width of at least one end of the primary gas discharge chamber. Certain embodiments may include a pair of primary gas discharge chambers aligned along the axis with a pre-ionizing cell being located between the pair of primary gas discharge chambers along with the width thereof.

Another aspect is a method of providing pre-ionization to a gas slab laser, the gas slab laser comprises a live electrode and a ground electrode, the live electrode and the ground electrode defining a primary gas discharge chamber therebetween. The live electrode is in communication with a first power supply, for example an AC power supply to provide a first excitation signal. The method comprises providing a pre-ionizing cell comprising a live electrode and a ground electrode defining a pre-ionizing gas discharge chamber therebetween. The live electrode is in electrical communication with a second power supply, for example a second AC power supply distinct from the first AC power supply to provide a second excitation signal delivering a discharge of electrons from the pre-ionizing gas discharge chamber. The pre-ionizing cell is aligned with the edges of its live and ground electrodes adjacent and substantially parallel to edges the ground slab and live slab electrodes, respectively.

The slab gas laser as described herein includes a pre-ionizer which provides electrons to a primary gas discharge chamber to allow for near instantaneous excitation of gas within the primary gas discharge chamber. The configuration of the pre-ionizing cell prevents cross-talking between an amplifier driving the main laser discharge and the one driving the pre-ionizing cell. Certain embodiments of the pre-ionizing cell are configured to reduce an electromagnetic field between the pre-ionizing cell electrodes which may disrupt operation of the primary gas discharge chamber.

DETAILED DESCRIPTION

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers expressing quantities of ingredients, dimensions reaction conditions and so forth used in the specification and claims are to be understood as being modified in all instances by the term "about". In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

Figure 1:
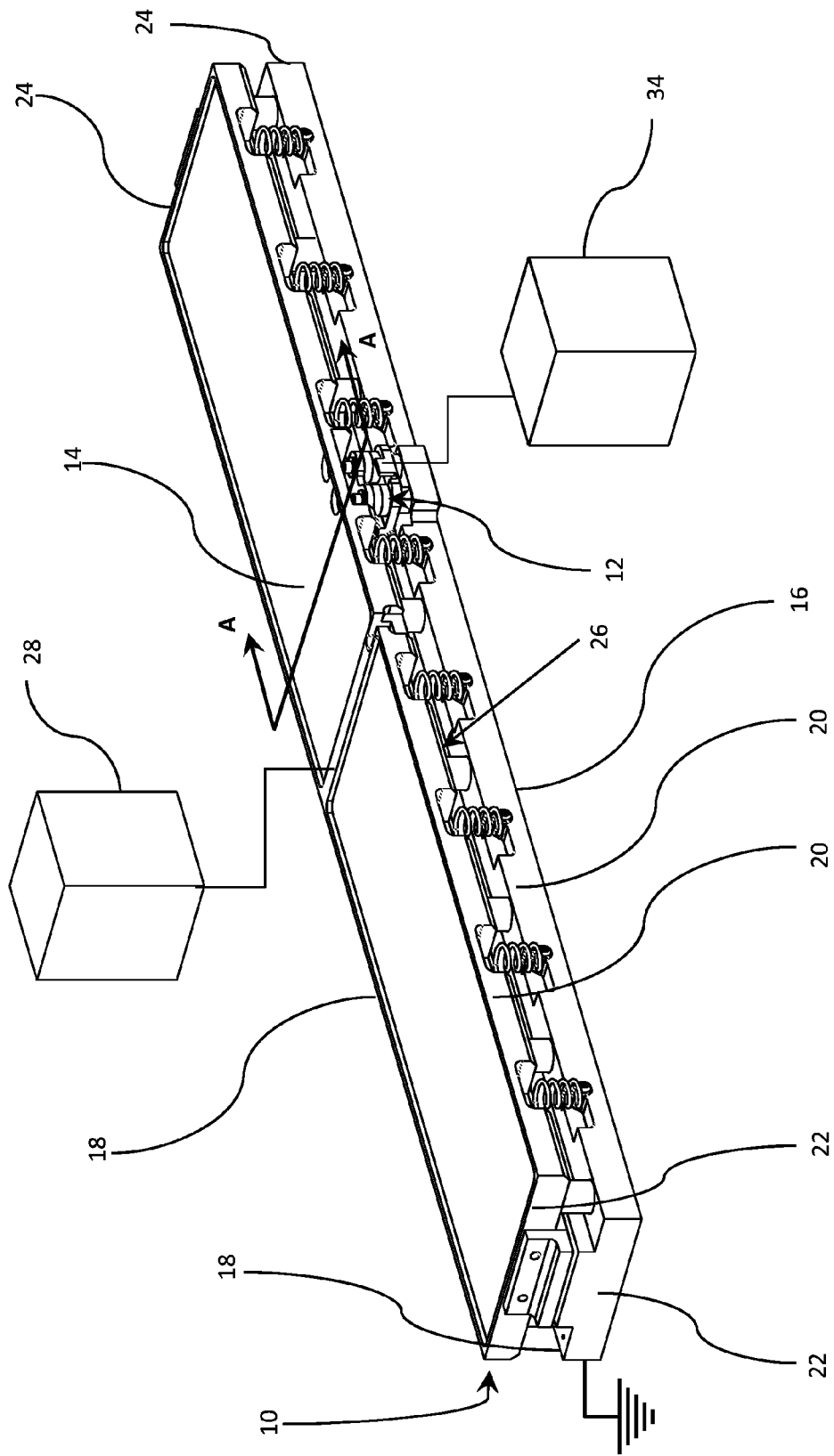
FIG. 1 is schematic representation of a slab gas laser with a pre-ionizing cell.
Figure 2:
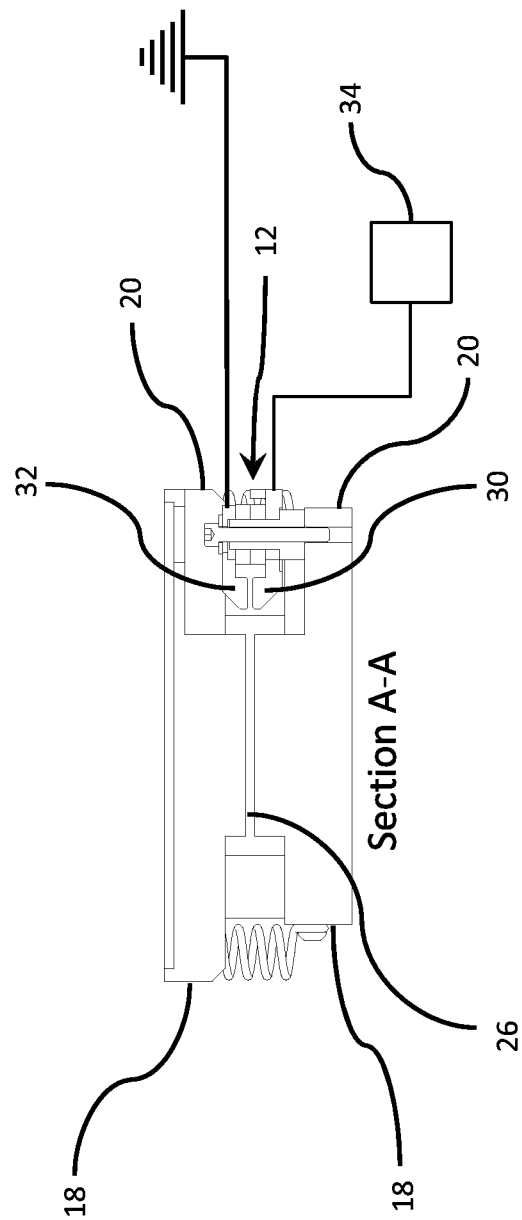
FIG. 2 is a cross-section of the slab gas laser with the pre-ionizing cell of FIG. 1 taken along line A-A of FIG. 1.

FIG. 1 is a perspective schematic view of a slab gas laser 10 and an associated pre-ionizing cell 12. As used herein, the slab gas laser 10 may be a $CO_2$ laser, a HeNe laser, a CO laser or any other type of gas medium laser. The slab gas laser 10 includes a live slab electrode 14 and a ground slab electrode 16. Each electrode has a rectangular footprint with a pair of elongate sides 18, 20 and a pair of width sides 22, 24. A primary gas discharge chamber 26 is defined between opposing surfaces of the live slab electrode 14 and the ground slab electrode 16. The live slab electrode 14 is in electrical communication with a first power supply 28 which may include, but is not limited to AC power supply capable of providing a first excitation signal. The pre-ionizing cell 12, which is best seen in FIGS. 2-5, includes a live electrode 30 and a ground electrode 32. The live electrode 30 is in electric communication with a second power supply 34 which may include, but is not limited to an AC power supply capable of providing a second excitation signal to the live electrode 30. The first and second excitation signals may be, for example, RF signals.

Figure 3:
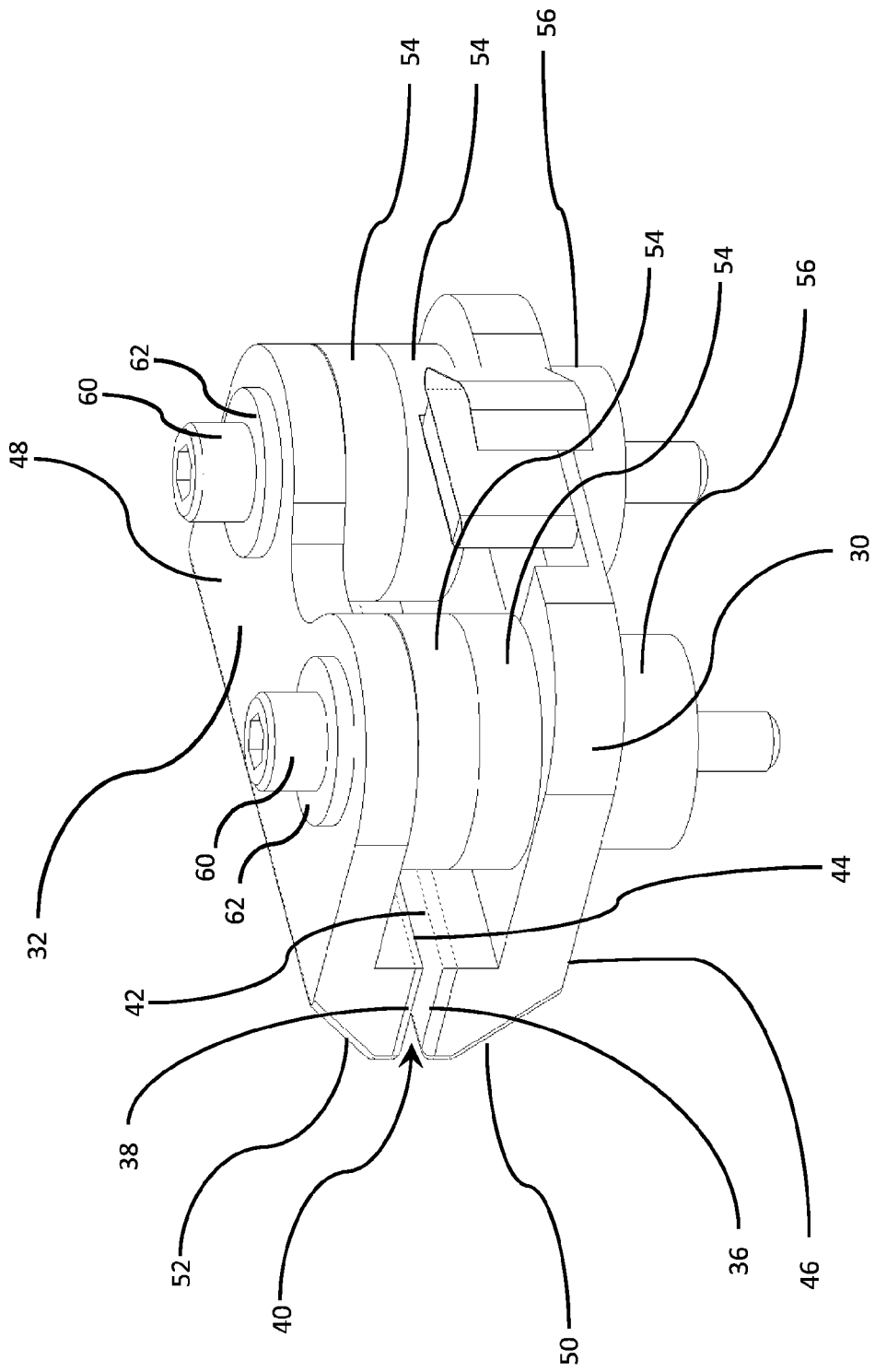
FIG. 3 is a perspective view of a pre-ionizing cell as depicted in FIG. 1.
Figure 4:
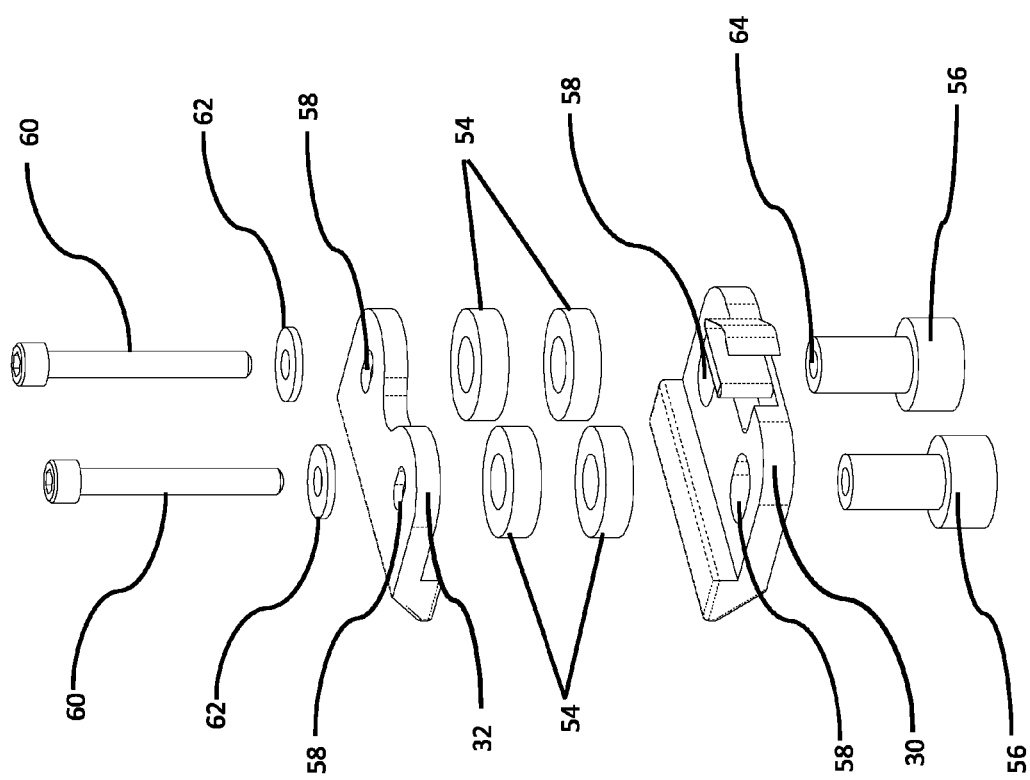
FIG. 4 is an exploded perspective view of the pre-ionizing cell of FIG. 3.

Referring to FIG. 3, the live electrode 30 and the ground electrode 32 each have a leading rectangular portion 36, 38 defining a pre-ionizing gas discharge chamber 40 therebetween. Each of the live electrode 30 and ground electrode 32 have an inner surface 42, 44 and an outer surface 46, 48 with the opposing inner surfaces 42, 44 defining a pre-ionizing gas discharge chamber 40. An inclined surface 50, 52 extends between near the inner surface 42, 44 of each electrode to the outer surface 46, 48. The inclined surface 50, 52 may be at an angle of about 45 degrees from the outer surface 46, 48. The live electrode 30 and ground electrode 32 are separated by one or more ceramic spacers 54. In the embodiment illustrated herein, two pairs of ceramic spacers 54 separate the live electrode 30 and ground electrode 32. A pair of ceramic bushings 56 is received in aligned holes 58 in the live electrode 30 and ground electrode 32 with the ceramic spacers 54 also received on the pair of ceramic bushings 56 between live and ground electrodes 30, 32. The assembly is held in place by a pair of screws 60 receiving washers 62 which in turn threadably engage internally threaded holes 64 of the pair of ceramic bushings 56.

Figure 5:
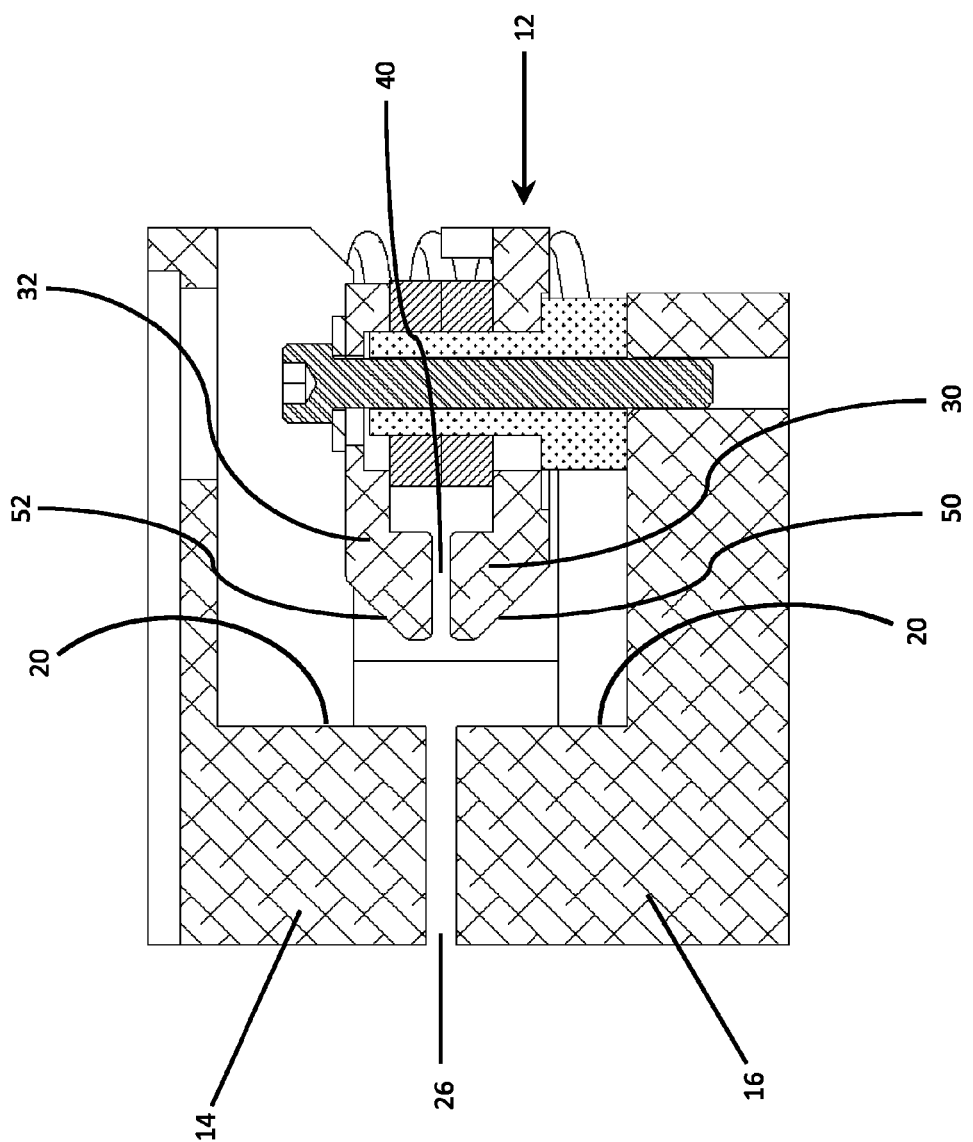
FIG. 5 is an enlarged cross-section of the pre-ionizing cell in association with the slab gas laser of FIG. 2.

In the embodiment illustrated in FIG. 1, the pre-ionizing cell 12 is operatively associated with the primary gas discharge chamber 26 of the slab gas laser 10 by providing the leading end of the live electrode 30 and the ground electrode 32 in close proximity and parallel to a elongate sides 20 of the live slab electrode 14 and the ground slab electrode 16. This relationship is perhaps best viewed in FIG. 5. As illustrated, the pre-ionizing cell 12 is oriented with the leading edges of its live electrode 30 and ground electrode 32 adjacent and substantially parallel to lengthwise edges 20 of the ground slab electrode 16 and live slab electrode 14, respectively. In use, the AC power supply 28 provides an excitation signal to the live electrode 30 which causes a release of electrons from the pre-ionizing gas discharge chamber 40 to the primary gas discharge chamber 26, as illustrated in FIG. 5. In practice, electrons with enough energy to provide near instantaneous discharge ignition in the primary gas discharge chamber 26 by the first excitation signal upon actuation of the first RF power supply at a power output capable of sustaining discharge in the primary gas discharge chamber 26 are generated by the pre-ionizing cell 12. However, the electrons do not provide enough energy to sustain discharge in the primary gas discharge chamber 26.

The inclined surface 50, 52 reduce an electromagnetic field between the live electrode 30 and the ground electrode 32 which might otherwise interfere with the primary gas discharge chamber 26.

Figure 6:
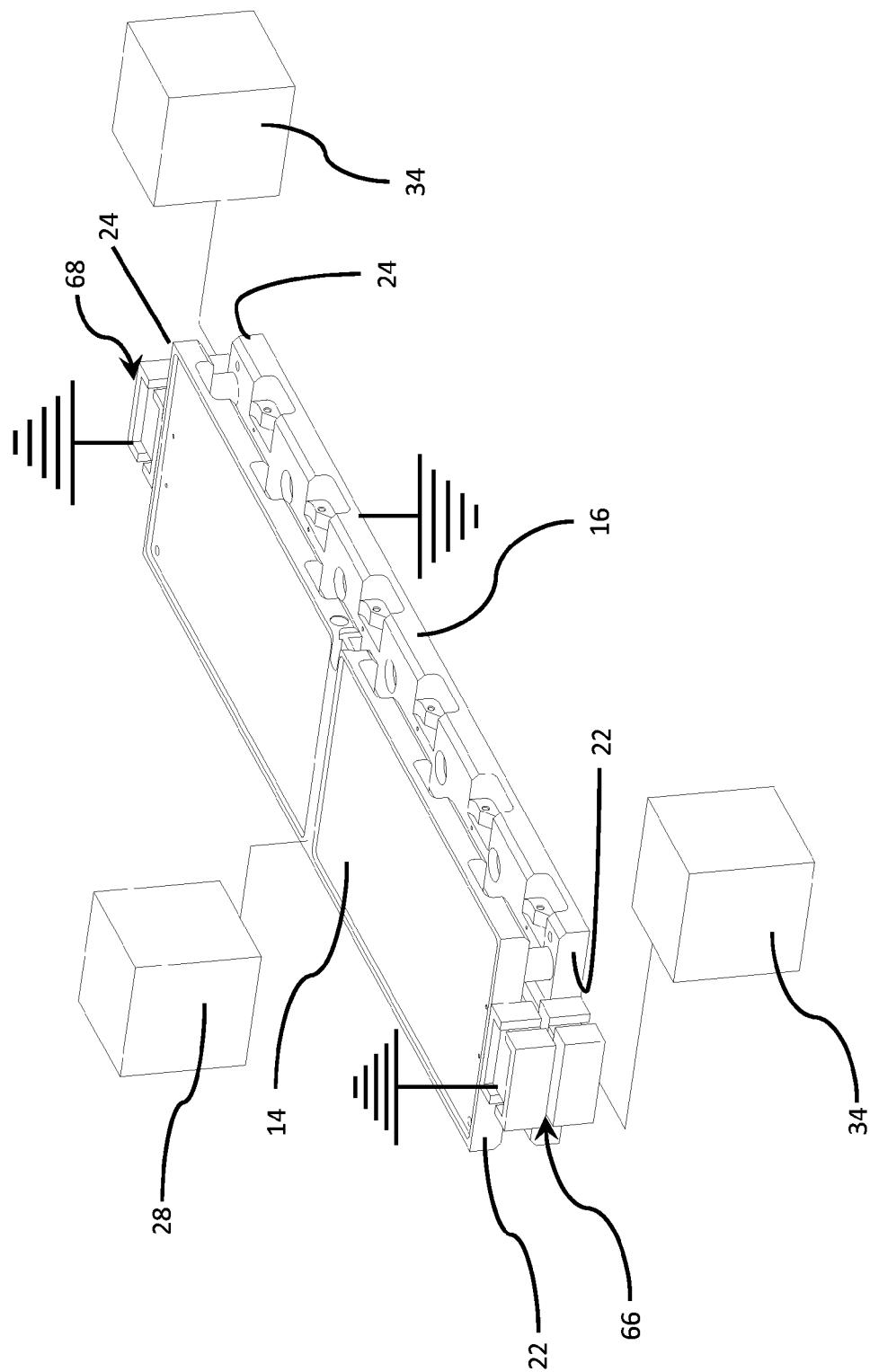
FIG. 6 is an alternate embodiment of a slab gas laser with a pre-ionizing cell.
Figure 7:
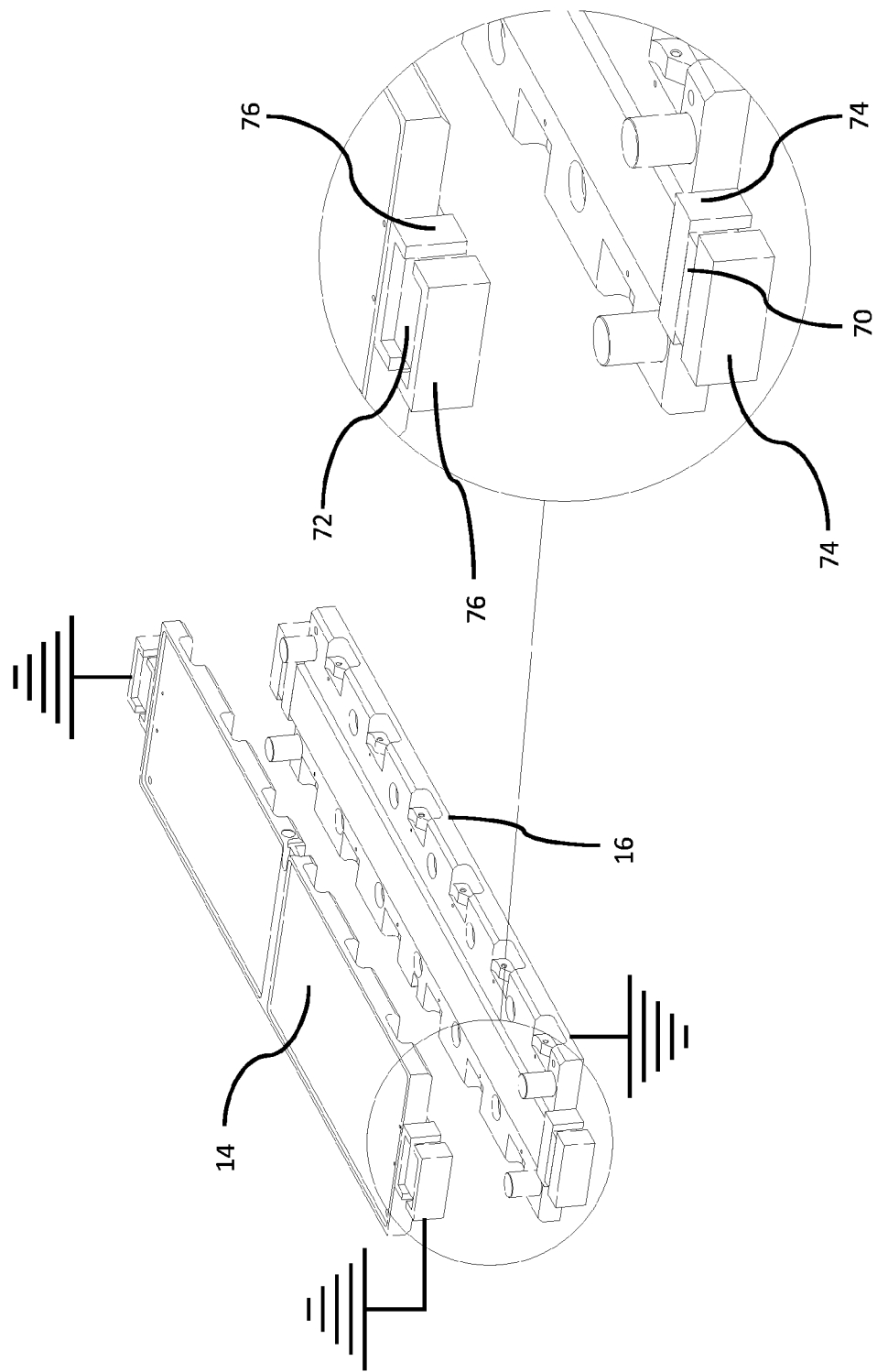
FIG. 7 is an enlarged, partially exploded view of the pre-ionizing cell of FIG. 6.

FIG. 6 is a schematic representation of a second embodiment of a slab gas laser 10 with pre-ionizing cells 66, 68. Like reference numbers will be used for like elements. In this second embodiment, pre-ionizing cells 66, 68 are provided along the width sides 22, 24 of the live slab electrode 14 and the ground slab electrode 16. The pre-ionizing cells 66, 68 may be configured as the pre-ionizing cell 12, or instead may be structured as shown in FIG. 7. In the embodiment illustrated in FIG. 7, the pre-ionizing cells 66, 68 consists of a live electrode 70 spaced from a ground electrode 72. Ceramic brackets 74 support the live electrode 70 and ceramic brackets 76 supports the ground electrode 72. As with the pre-ionizing cell 12, the live electrode 70 and the ground electrode 72 are configured to define a pre-ionizing gas discharge chamber 40 therebetween for providing electrons to the primary gas discharge chamber 26 for near instantaneous discharge ignition in the primary gas discharge chamber 26.

Figure 8:
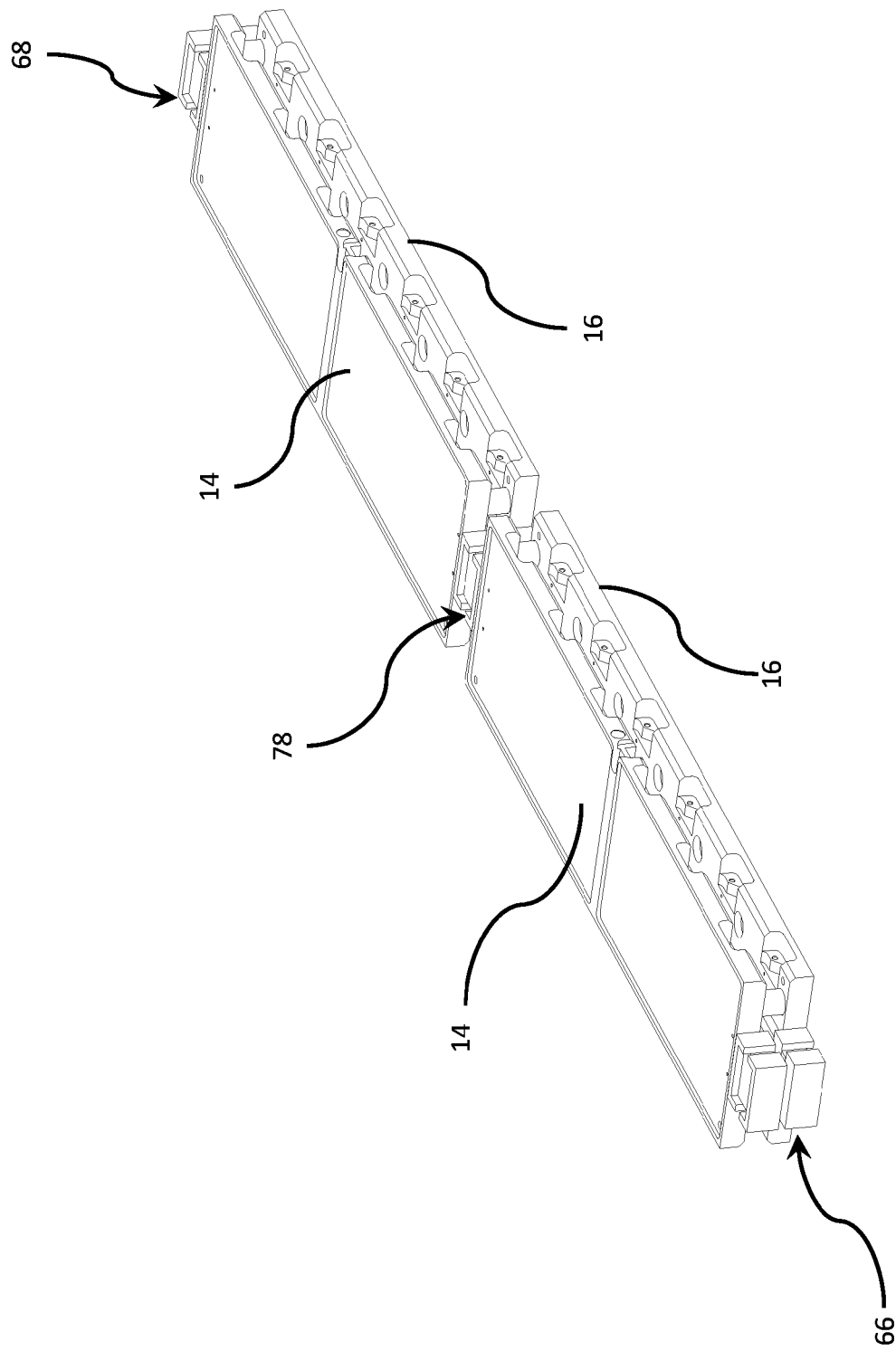
FIG. 8 is a second alternate embodiment of a slab gas laser with the pre-ionizing cell.

In a second alternate embodiment illustrated in FIG. 8, two pairs of live slab electrodes 14 and ground slab electrodes 16 are aligned along an axis to define axially aligned primary gas discharge chambers 26 with a pre-ionizing cell 78 having a structure similar to the pre-ionizing cells 66, 68, disposed between the pair of primary gas discharge chambers 26.

EXAMPLES

The following examples are provided for illustrative purposes only and are not intended to limit the scope of the invention.

A pre-ionizing cell 12 constructed in accordance with the first embodiment was provided with the live electrode 30 and the ground electrode 32 having leading rectangular portions 36, 38 of length of 30.5 mm and a width of 6.35 mm, defining a pre-ionizing gas discharge chamber 40 having an area of 193.8 mm². A gap of 1.75 mm was provided between the surfaces of the rectangular portions 36, 38. The leading ends of the electrodes 30, 32 were spaced 6 mm from the primary gas discharge chamber 26. Average power provided to the live electrode 30 was 50 watts and an average power to the live electrode 30 was 5 watts. The duty cycle and frequency were 10% at 10 kHz. The pre-ionizing cell 12 sized and operated under these parameters provided a near instantaneous discharge ignition in a primary gas discharge chamber having the following operating parameters:

Length: 600 mm
Width: 40 mm
Area: 24,000 mm²
Gap: 1.75 mm
Average power to live slab electrode: 1500 Watts
Duty cycle and frequency: duty cycles from 1% to 100% and frequencies from 100 Hz to 40 kHz Various ranges of parameters for the pre-ionizing cell were tested, with the example described above found to yield optimum results. For example, an embodiment with the leading rectangular portions 36, 38 of a length of 30.5 mm and a width of 12.7 mm was tested. A gap between the pre-ionizing electrodes 30, 32 of 1.5 mm was tested. Spacing of the leading end of the electrodes 30, 32 of 5 mm, 6 mm and 7 mm were tested. Peak input powers to the live electrode 30 of 20, 40, 50, and 400 watts were tested with an average power not to exceed 8 watts. The following frequencies were all tried: 5 kHz, 7.5 kHz, 10 kHz, 15 kHz, 20 kHz and 30 kHz. Examples of different power levels and duty cycles applied at the frequencies are as follows:

20 watts input, up to 40% duty cycle
40 watts input, up to 20% duty cycle
50 watts input, up to 15% duty cycle
100 watts input, up to 8% duty cycle
400 watts input, up to 2% duty cycle Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A slab gas laser comprising:
a live slab electrode and a ground slab electrode, the live slab electrode and the ground slab electrode defining a primary gas discharge chamber therebetween, the live slab electrode being in electrical communication with a first AC power supply to provide a first excitation signal; and
a pre-ionizing cell comprising a live electrode and a ground electrode defining a pre-ionizing gas discharge chamber therebetween, the live electrode being in electrical communication with a second AC power supply distinct from the first AC power supply to provide a second excitation signal delivering a discharge of electrons from the pre-ionizing gas discharge chamber,
the pre-ionizing gas discharge chamber being operatively associated with the primary gas discharge chamber to provide electrons with enough energy to provide near instantaneous discharge ignition in the primary gas discharge chamber by the first excitation signal upon actuation of the first AC power supply at a power output capable of sustaining discharge in the primary gas discharge chamber but at a power output otherwise unable to provide near instantaneous discharge ignition in the primary gas discharge chamber, the operative association of the pre-ionizing and primary gas discharge chambers comprising the pre-ionizing cell being oriented with edges of its live and ground electrodes adjacent and substantially parallel to edges of the ground slab and live slab electrodes, respectively, wherein the live electrode and ground slab electrode are on one side of the primary gas discharge chamber and the ground electrode and the live slab electrode are on the other side of the primary gas discharge chamber.

2. The slab gas laser of claim 1 wherein each of the live electrode and the ground electrode have an inner surfaces defining the pre-ionizing gas discharge chamber therebeween and an outer surface, further comprising at least one of the live electrode and the ground electrode having an inclined surface extending between near its inner surface to the outer surface, such that the gas discharge chamber extends beyond the outer surface toward the primary gas discharge chamber.

3. The slab gas laser of claim 2 wherein the inclined surface is at about 45 degrees from the outer surface.

4. The slab gas laser of claim 1 further comprising a waveguide provided between the live slab and ground slab electrodes.

5. The slab gas laser of claim 1 wherein the second excitation signal alone cannot cause gas discharge in the primary gas discharge chamber.

6. The slab gas laser of claim 1 wherein pre-ionizing cell delivers a substantially constant discharge of electrons.

7. The slab gas laser of claim 1 wherein the primary gas discharge chamber has an elongate length along an axis and a width transverse the axis with the pre-ionizing cell being located along the length of the primary discharge chamber.

8. The slab gas laser of claim 7 further comprising a plurality of pre-ionizing cells spaced along the length of the primary gas discharge chamber.

9. The slab gas laser of claim 1 wherein the primary gas discharge chamber has an elongate length along an axis and a width transverse the axis with a pre-ionizing cell being located along the width of at least one end the primary discharge chamber.

10. The slab gas laser of claim 9 further comprising a pair of primary gas discharge chambers aligned along the axis, a pre-ionizing cell being located between the pair of primary gas discharge chambers along the width thereof.

11. A method of providing pre-ionization to a slab gas laser, the slab gas laser comprising a live slab electrode and a ground slab electrode, the live slab electrode and the ground slab electrode defining a primary gas discharge chamber therebetween, the live slab electrode being in electrical communication with a first AC power supply to provide a first excitation signal, the method comprising:

providing a pre-ionizing cell comprising a live electrode and a ground electrode defining a pre-ionizing gas discharge chamber therebetween, the live electrode being in electrical communication with a second AC power supply distinct from the first AC power supply to provide a second excitation signal delivering a discharge of electrons from the pre-ionizing gas discharge chamber; and aligning the pre-ionizing cell with edges of its live and ground electrodes adjacent and substantially parallel to edges the ground slab and live slab electrodes, respectively, wherein the live electrode and ground slab electrode are on one side of the primary gas discharge chamber and the ground electrode and the live slab electrode are on the other side of the primary gas discharge chamber.

* * * * *